(12) United States Patent
Liao

(10) Patent No.: US 7,699,499 B2
(45) Date of Patent: Apr. 20, 2010

(54) AUTOMATED LIGHT-EMITTING APPARATUS AND WEARABLE OBJECT INCLUDING THE SAME

(75) Inventor: Juinne-Ching Liao, Taipei (TW)

(73) Assignee: Shen-Ko Tseng, Taipei (TW)

( * ) Notice: Subject to any disclaimer, the term of this patent is extended or adjusted under 35 U.S.C. 154(b) by 225 days.

(21) Appl. No.: 12/028,081

(22) Filed: Feb. 8, 2008

(65) Prior Publication Data

US 2009/0201670 A1   Aug. 13, 2009

(51) Int. Cl.
*F21L 13/06* (2006.01)
(52) U.S. Cl. .................. 362/276; 362/192; 362/411; 362/394
(58) Field of Classification Search .......... 362/103, 362/570, 183, 276, 295, 394, 411, 802, 205, 362/253, 192, 193; 36/137; 310/73
See application file for complete search history.

(56) References Cited

U.S. PATENT DOCUMENTS 4,298,910 A * 11/1981 Price ............................ 362/35
7,121,697 B2 * 10/2006 Hsu ............................ 362/386
7,278,758 B2 * 10/2007 Esses ......................... 362/267
7,431,474 B2 * 10/2008 Mah .......................... 362/192
7,510,293 B2 * 3/2009 Chyn ......................... 362/103

* cited by examiner

*Primary Examiner*—Bao Q Truong
(74) *Attorney, Agent, or Firm*—Banger Shia

(57) ABSTRACT

The invention provides an automated light-emitting apparatus, which can be disposed in an object, includes a light-emitting unit, a force-sensing module, and a power-generating module. The force-sensing module includes a first component and a second component engaged to the first component. When the object receives an external force, the force-sensing module changes the distance between a first portion of the first component and a second portion of the second component. Moreover, the power-generating module includes a coil coupled to a magnetic member, the magnetic member engaged to the first component, and a magnetic conductor engaged to the second component. Particularly, when the distance between the first portion and the second portion is changed, the coil generates an induced electromotive force for supporting the light-emitting unit with needed power.

6 Claims, 12 Drawing Sheets

AUTOMATED LIGHT-EMITTING APPARATUS AND WEARABLE OBJECT INCLUDING THE SAME

BACKGROUND OF THE INVENTION

1. Field of the Invention

The present invention relates generally to an automated light-emitting apparatus and a wearable object including the same, and more particularly, the automated light-emitting apparatus of the invention can generate power and emit light, in response to the motion of the object, without extra power supply.

2. Description of the Prior Art

Poor illumination at night is a setback to night activities. Problems regarding difficult identification and safety may occur. People who go jogging or cycling at night may be hit by cars due to insufficient illumination. Sports playing in open places may have to be stopped at night if street lamps do not provide enough illumination. It is, therefore, necessary to find means to enhance the safety and ensure the smooth-going of night activities.

Based on the consideration of safety as mentioned above, a plurality of wearable objects with light-emitting device have been developed, such as sneakers, running shoes, sportswear, wrist belts, or head belts. Said wearable objects generally include at least a lighting source, such as light-emitting diode (LED); a power source, such as a battery; and a switch for connecting the battery to the lighting source to drive the lighting source to be turned on when the user touches or pushes on the switch.

Although the above-mentioned wearable objects can reach the goal of lighting, the defect is that it needs a battery to be the power source. When the power of battery is exhausted or when the battery is damaged, the light-emitting device may not function. Moreover, discarded or damaged batteries are hard to be recovered and recycled, and that causes the problem of environmental pollution.

SUMMARY OF THE INVENTION

Accordingly, an aspect of the present invention is to provide an automated light-emitting apparatus which can be disposed in an object. Particularly, the automated light-emitting apparatus of the present invention can be driven to generate power in response to an external force received by the object. Therefore, the automated light-emitting apparatus of the invention can supply power needed by light-emitting unit without a battery, so as to provide lighting in an energy-saving way and which fits the requirement of environment protection as well.

According to an embodiment of the invention, the automated light-emitting apparatus can be disposed in an object, and the automated light-emitting apparatus includes a light-emitting unit, a force-sensing module, and a power-generating module. The force-sensing module further comprises a first component and a second component engaged with the first component. When the object receives an external force, the force-sensing module changes a distance between a first portion of the first component and a second portion of the second component. Furthermore, the power-generating module further includes a coil, a magnetic member, and a magnetic conductor. The coil is coupled to the magnetic member, and the magnetic member is engaged with the first portion of the first component, and the magnetic conductor is engaged with the second portion of the second component. Particularly, when the distance between the first portion and the second portion is changed, the coil generates an induced electromotive force for supporting the light-emitting unit with needed power.

According to another embodiment of the invention, the automated light-emitting apparatus can be disposed in an object, and the automated light-emitting apparatus includes a light-emitting unit and a power-generating module. The power-generating module includes a tubular structure, a magnetic member and a coil. The tubular structure contains a magnetic conductor; the magnetic member is disposed around the tubular structure; and the coil is coupled to the magnetic member. Particularly, when the object receives an external force, the magnetic conductor moves back and forth in the tubular structure, so that the coil generates an induced electromotive force for supporting the light-emitting unit with needed power.

According to yet another embodiment of the invention, the automated light-emitting apparatus can be disposed in an object, and the automated light-emitting apparatus includes a light-emitting unit and a power-generating module. The power-generating module includes an elastic component, a first magnetic conductor, a second magnetic conductor, and a coil. The elastic component has a first end and a second end opposite to the first end; the first magnetic conductor is disposed on the first end, the second magnetic conductor is disposed on the second end; and the coil is coupled to the first magnetic conductor or the second magnetic conductor. Additionally, the first magnetic conductor or the second magnetic conductor includes a magnetic member. Particularly, when the object receives an external force, the distance between the first magnetic conductor and the second magnetic conductor is changed, and the coil generates an induced electromotive force for supporting the light-emitting unit with needed power.

According to still another embodiment of the invention, the automated light-emitting apparatus can be disposed in an object, and the automated light-emitting apparatus includes a light-emitting unit and a power-generating module. The power-generating module includes a first magnetic conductor, a coil, a first component, and a second component. The second component is rotatably mounted in the object and engaged with the first component, and the second component includes a second magnetic conductor. Furthermore, the coil is coupled to the first magnetic conductor or the second magnetic conductor. The first magnetic conductor or the second magnetic conductor includes a magnetic member. Particularly, when the object receives an external force, the first component drives the second component to rotate, so as to change the distance between the first magnetic conductor and the second magnetic conductor, and the coil generating an induced electromotive force for supporting the light-emitting unit with needed power.

Another aspect of the present invention is to provide a wearable object which contains the above-mentioned automated light-emitting apparatus. Accordingly, as described above, the wearable object of the invention can provide illumination in an energy-saving way and meets the requirement of environment protection.

According to an embodiment, the wearable object of the invention includes a light-emitting unit, a force-sensing module, and a power-generating module. The force-sensing module further includes a first component and a second component engaged with the first component. When the object receives an external force, the force-sensing module changes a distance between a first portion of the first component and a second portion of the second component. Furthermore, the power-generating module further includes a coil, a magnetic member and a magnetic conductor. The coil is coupled to the magnetic member, and the magnetic member is engaged with the first portion of the first component, and the magnetic conductor is engaged with the second portion of the second component. Particularly, when the distance between the first portion and the second portion is changed, the coil generates an induced electromotive force for supporting the light-emitting unit with needed power.

According to another embodiment, the wearable object of the invention includes a light-emitting unit and a power-generating module. The power-generating module includes a tubular structure, a magnetic member and a coil. The tubular structure contains a magnetic conductor; the magnetic member is disposed around the tubular structure; and the coil is coupled to the magnetic member. Particularly, when the object receives an external force, the magnetic conductor moves back and forth in the tubular structure, so that the coil generates an induced electromotive force for supporting the light-emitting unit with needed power.

According to yet another embodiment, the wearable object of the invention includes a light-emitting unit and a power-generating module. The power-generating module includes an elastic component, a first magnetic conductor, a second magnetic conductor, and a coil. The elastic component has a first end and a second end opposite to the first end; the first magnetic conductor is disposed on the first end; the second magnetic conductor is disposed on the second end; and the coil is coupled to the first magnetic conductor or the second magnetic conductor. Additionally, the first magnetic conductor or the second magnetic conductor includes a magnetic member. Particularly, when the object receives an external force, the distance between the first magnetic conductor and the second magnetic conductor is changed, and the coil generates an induced electromotive force for supporting the light-emitting unit with needed power.

According to yet another embodiment, the wearable object of the invention includes a light-emitting unit and a power-generating module. The power-generating module includes a first magnetic conductor, a coil, a first component, and a second component. The second component is rotatably mounted in the object and engaged with the first component, and the second component includes a second magnetic conductor. Furthermore, the coil is coupled to the first magnetic conductor or the second magnetic conductor. The first magnetic conductor or the second magnetic conductor includes a magnetic member. Particularly, when the object receives an external force, the first component drives the second component to rotate, so as to change the distance between the first magnetic conductor and the second magnetic conductor, and the coil generating an induced electromotive force for supporting the light-emitting unit with needed power.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

DETAILED DESCRIPTION OF THE INVENTION

The present invention provides an automated light-emitting apparatus and a wearable object comprises the automated light-emitting apparatus.

Figure 1A:
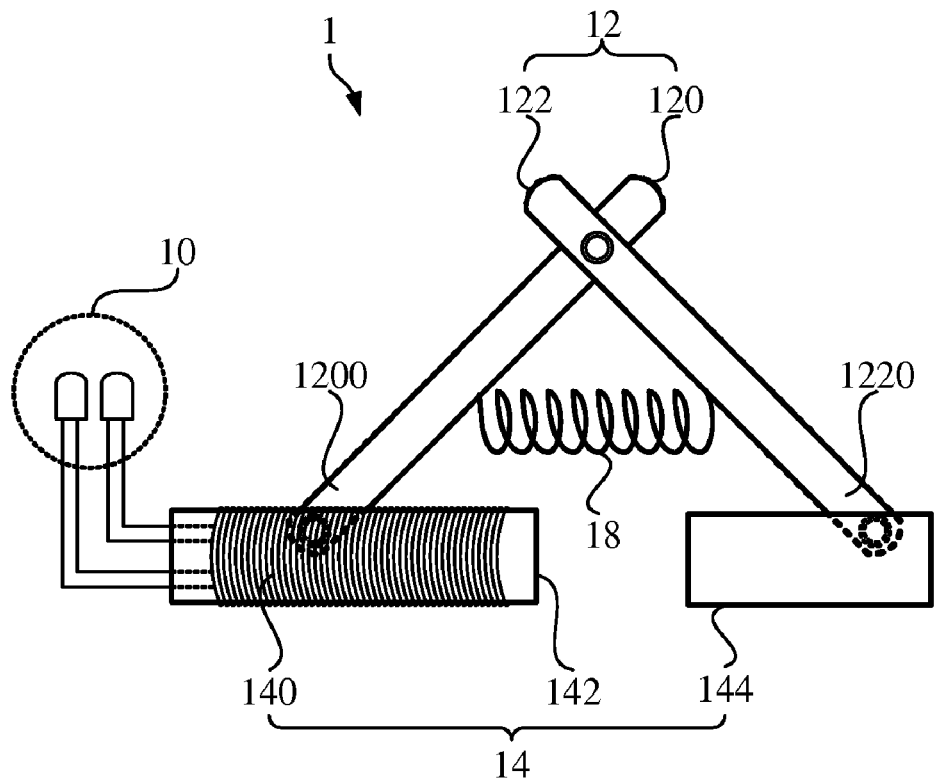
FIG. 1A and FIG. 1B illustrate the automated light-emitting apparatus of an embodiment of the invention.
Figure 1B:
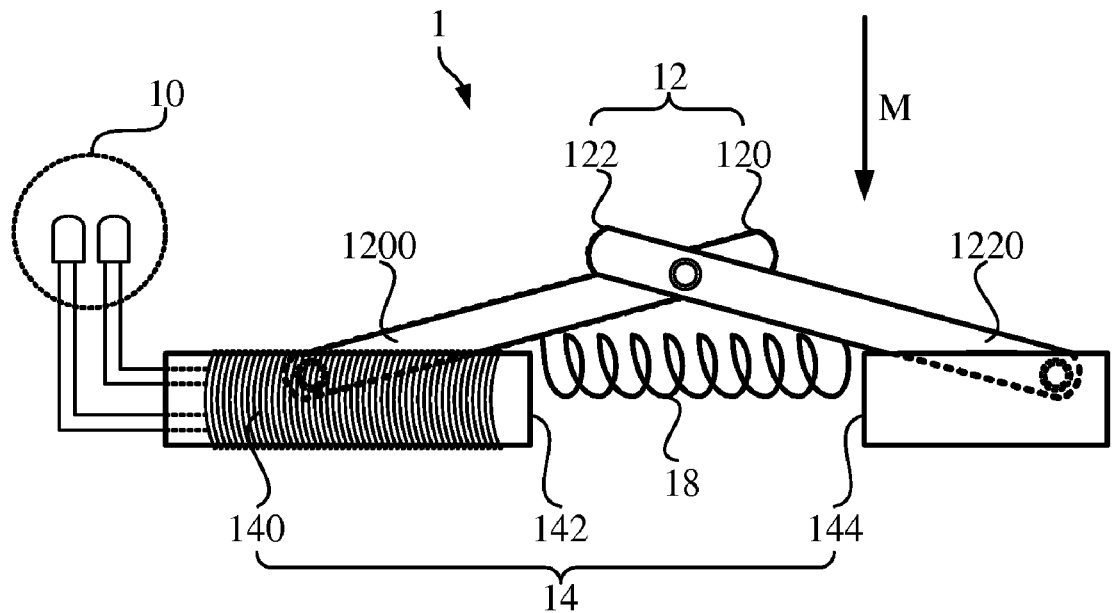

Please refer to FIG. 1A and FIG. 1B, which illustrate the automated light-emitting apparatus of an embodiment of the invention. As shown in FIG. 1A and FIG. 1B, the automated light-emitting apparatus 1 includes a light-emitting unit 10, a force-sensing module 12, and a power-generating module 14. Moreover, the automated light-emitting apparatus 1 can be optionally disposed in an object (not shown), such as, but not limited to, shoes, gloves, clothes and accessories. Additionally, the light-emitting unit 10 can include a light-emitting device such as a light-emitting diode or other devices.

As shown in FIG. 1A and FIG. 1B, the force-sensing module 12 comprises a first component 120 and a second component 122 engaged with the first component 120. Moreover, the power-generating module includes a coil 140, a magnetic member 142, and a magnetic conductor 144. The coil 140 can be coupled to the magnetic member 142; the magnetic member 142 can be engaged to the first portion 1200 of the first component 120; and the magnetic conductor 144 can be engaged to the second portion 1220 of the second component 122.

Before the object receives the external force, the automated light-emitting apparatus 1 of the invention appears in its first state as shown in FIG. 1A. Furthermore, when the object receives the external force, the automated light-emitting apparatus 1 appears in its second state as shown in FIG. 1B. Particularly, in the second state, the distance between the first portion 1200 of the first component 120 and the second portion 1220 of the second component 122 is changed (to be lengthened). On the contrary, when the external force is smaller or disappears, the distance between the first portion 1200 and the second portion 1220 is in between the first state and the second state or shifts back to the first state. Accordingly, the coil 140 of the power-generating module 14 can generate the induced electromotive force for supporting the light-emitting unit 10 with needed power.

Furthermore, the automated light-emitting apparatus 1 can further comprise an elastic component (such as, but not limited to, a spring), which is disposed between the first component 120 and the second component 122 for supplying an elastic power to the first component 120 and the second component 122. For example, when the automated light-emitting apparatus 1 is not forced, it is in a static state as shown in FIG. 1A. On the contrary, when the automated light-emitting apparatus 1 is forced along the direction M, it is in an elongating state as shown in FIG. 1B (the elastic component 18 is elongated in this state). Furthermore, when the external force is smaller or disappears, the restoring force of the elastic component 18 can help the automated light-emitting apparatus 1 to go back to the static state of FIG. 1A.

Figure 1C:
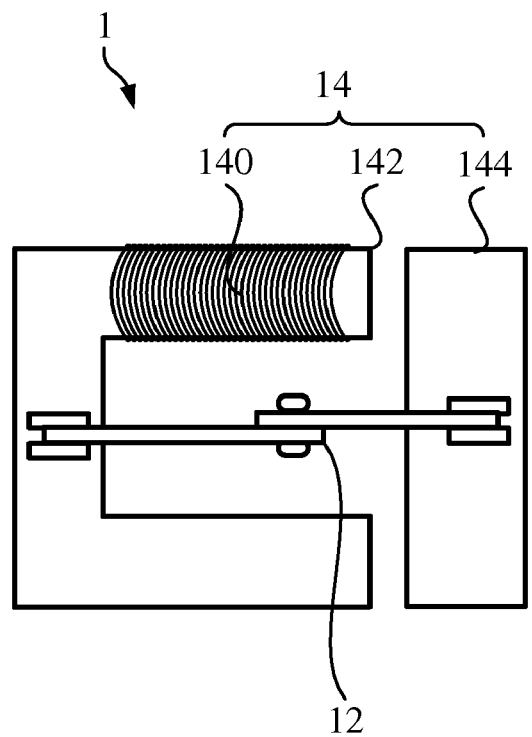
FIG. 1C and FIG. 1D show top views of the automated light-emitting apparatus of an embodiment of the invention.
Figure 1D:
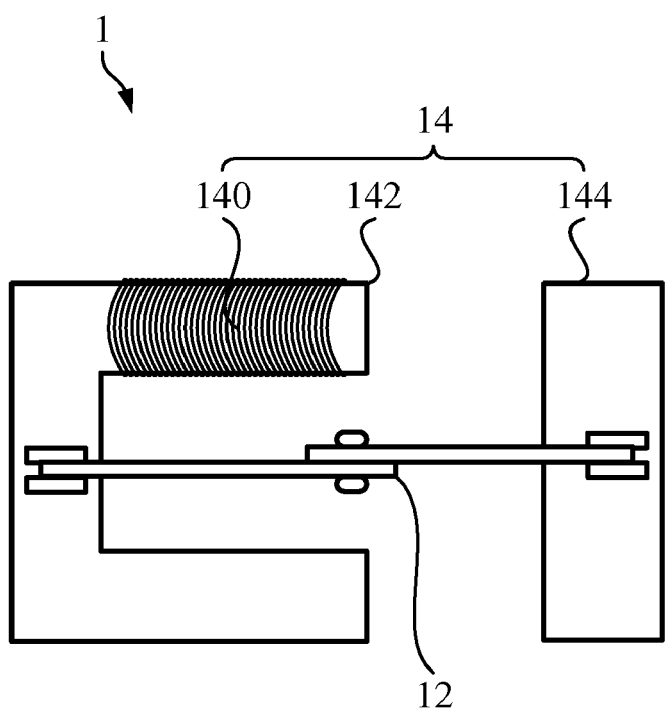

Please refer to FIGS. 1C and 1D, which show the top view of an automated light-emitting apparatus of another embodiment of the invention. As shown in FIGS. 1C and 1D, the magnetic member 142 of the invention has the shape of a hoof, and the magnetic conductor 144 can correspond to both ends of the magnetic member. Furthermore, the coil 140 can be coupled to one side of the magnetic member 142. When the object is not forced, the automated light-emitting apparatus 1 of the invention is in a first state as shown in FIG. 1C. However, when the object is forced, the automated light-emitting apparatus 1 of the invention can be forced and displays a second state as shown in FIG. 1D. Particularly, when the automated light-emitting apparatus 1 of the invention repeatedly moves between the first state and the second state, the distance between the magnetic member 142 and the magnetic conductor 144 is repeatedly changed. Accordingly, the coil 140 of the power-generating module 14 can generate an induced electromotive force for supporting the light-emitting unit with needed power.

Figure 2:
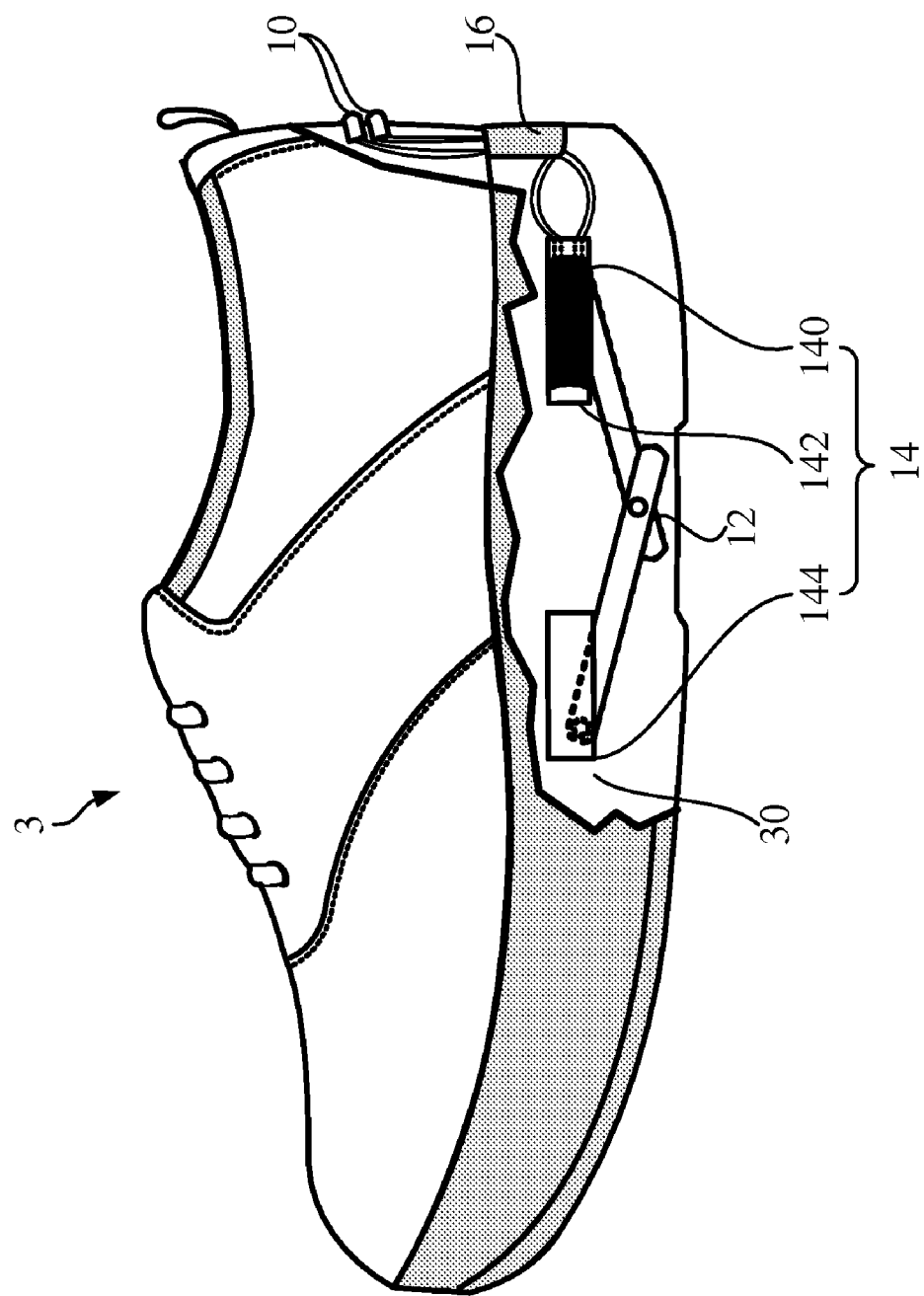
FIG. 2 is a partial sectional view of the wearable object of an embodiment of the invention.

Please refer to FIG. 2, a partial sectional view of the wearable object of an embodiment of the invention. As shown in FIG. 2, the wearable object is a sports shoe 3, and the sports shoe 3 comprises the above-mentioned light-emitting unit 10, force-sensing module 12 and power-generating module 14. Please note that, in practice, the wearable object of the invention can be other suitable objects but not limited to the sports shoe of the embodiment.

The force-sensing module 12 and the power-generating module 14 can be disposed in the bottom space 30 of the sports shoe 3. Additionally, the power-generating module 14 comprises the magnetic member 140 coupled with the coil, and magnetic conductor 142. When a user wears the sports shoe 3 in FIG. 2 and moves, the stamping action of the user can generate the external force to the force-sensing module 12, so as to shorten the distance between the magnetic member 140 and the magnetic conductor 142. On the contrary, when the user raises his or her foot from the ground, the distance between the magnetic member 140 and the magnetic conductor 142 can be lengthened. Accordingly, the coil can generate the induced electromotive force.

As shown in FIG. 2, the automated light-emitting apparatus of the invention can further comprises a converting module 16 electrically connected to the power-generating module 14 and the light-emitting unit 10, for converting the induced electromotive force to a direct current needed by the light-emitting unit 10. The converting module 16 can be disposed in the heel of the sports shoe 3. Furthermore, the light-emitting unit 10 can be disposed at the back of the sports shoe 3. In practice, the light-emitting unit 10 can optionally be disposed on the inside or on the outside of the sports shoe 3.

In practice, the wearable object comprises a cushion element, such as a shoe-pad. The cushion element can be disposed on the force-sensing module and be touched with the first component and/or the second component directly or indirectly (e.g. through a spring or other elements). Furthermore, when the cushion element is forced by the external force (such as the force caused by the stamping action of the user), the cushion element represses the force-sensing module, so that the distance between the first portion of the first component and the second portion of the second component is changed.

Figure 3:
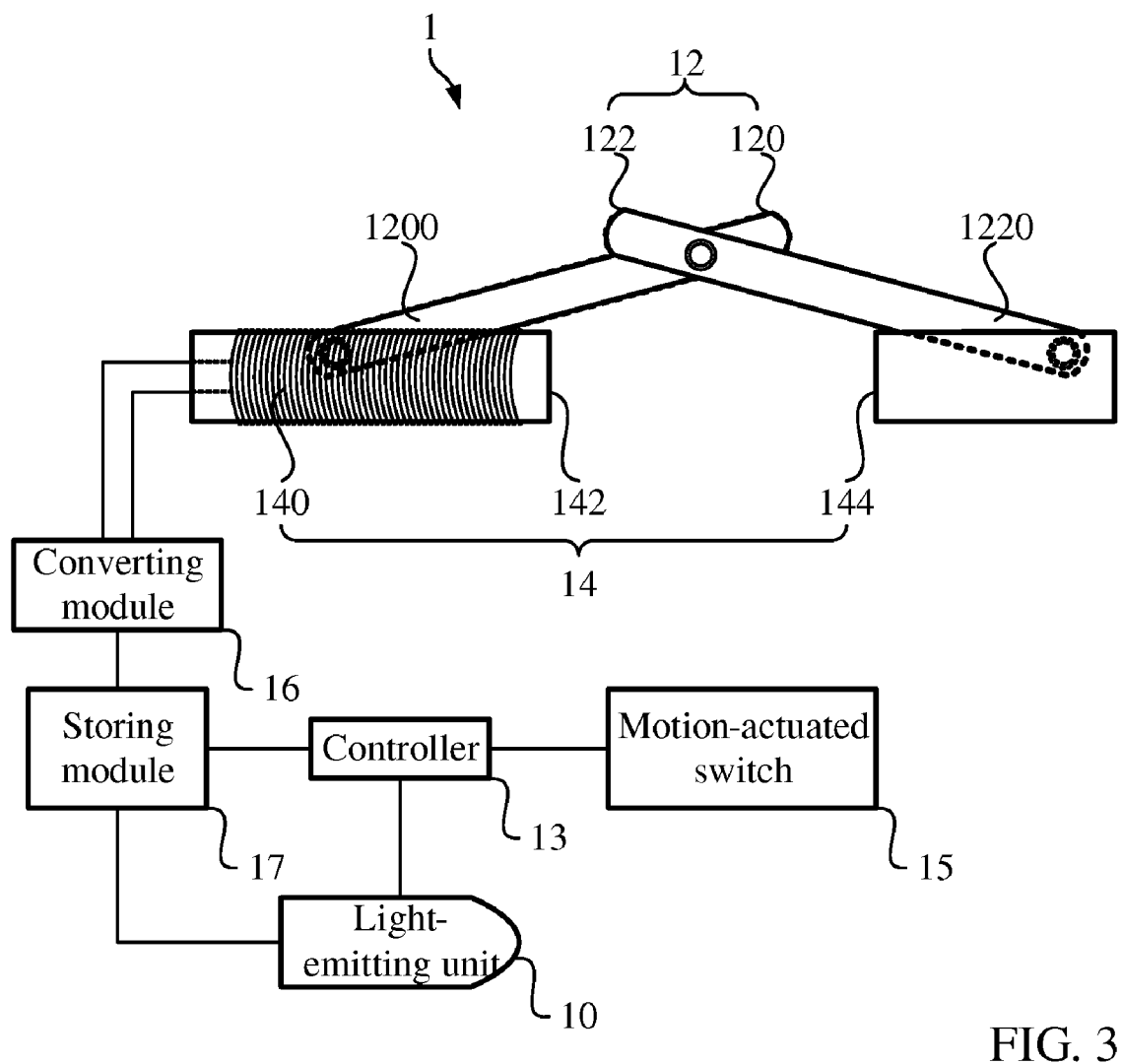
FIG. 3 illustrates the automated light-emitting apparatus of an embodiment of the invention.

Please refer to FIG. 3, which shows an automated light-emitting apparatus of an embodiment of the invention. As shown in FIG. 3, except for the light-emitting unit 10, the force-sensing module 12, the power-generating module 14, and the converting module 16, the automated light-emitting apparatus 1 of the invention further comprises a controller 13, a motion-actuated switch 15, and a storing module 17.

The storing module 17 can be electrically connected to the converting module for storing the power of the direct current. The controller 13 is connected to the light-emitting unit 10 and the storing module 17 respectively, for receiving the power and driving the light-emitting unit 10 to light. The motion-actuated switch 15 can be connected to the controller 13 for generating an activating signal according to a movement of the object (e.g. the above-mentioned sports shoes). Moreover, the controller 13 can drive the light-emitting unit 10 to light.

In practice, the movement of the object can respond to the movement of a user. For example, when the user wears sports shoes and runs, the sports shoes can therefore be shacked, vibrated, and rocked. For another example, when the user wears gloves and acts in a game, the gloves can therefore be rocked. Please note that, the automated light-emitting apparatus of the invention can optionally be disposed in/on any other suitable objects, but not limited to the above-mentioned objects. Accordingly, the movement can be different in accordance with the different objects but not limited to the above-mentioned movement.

In practice, some or all of the elements of the automated light-emitting apparatus of the invention can optionally be sealed in a water-proof enclosure, to enhance the resistance of the automated light-emitting apparatus to water, dust and oxygen.

Figure 4:
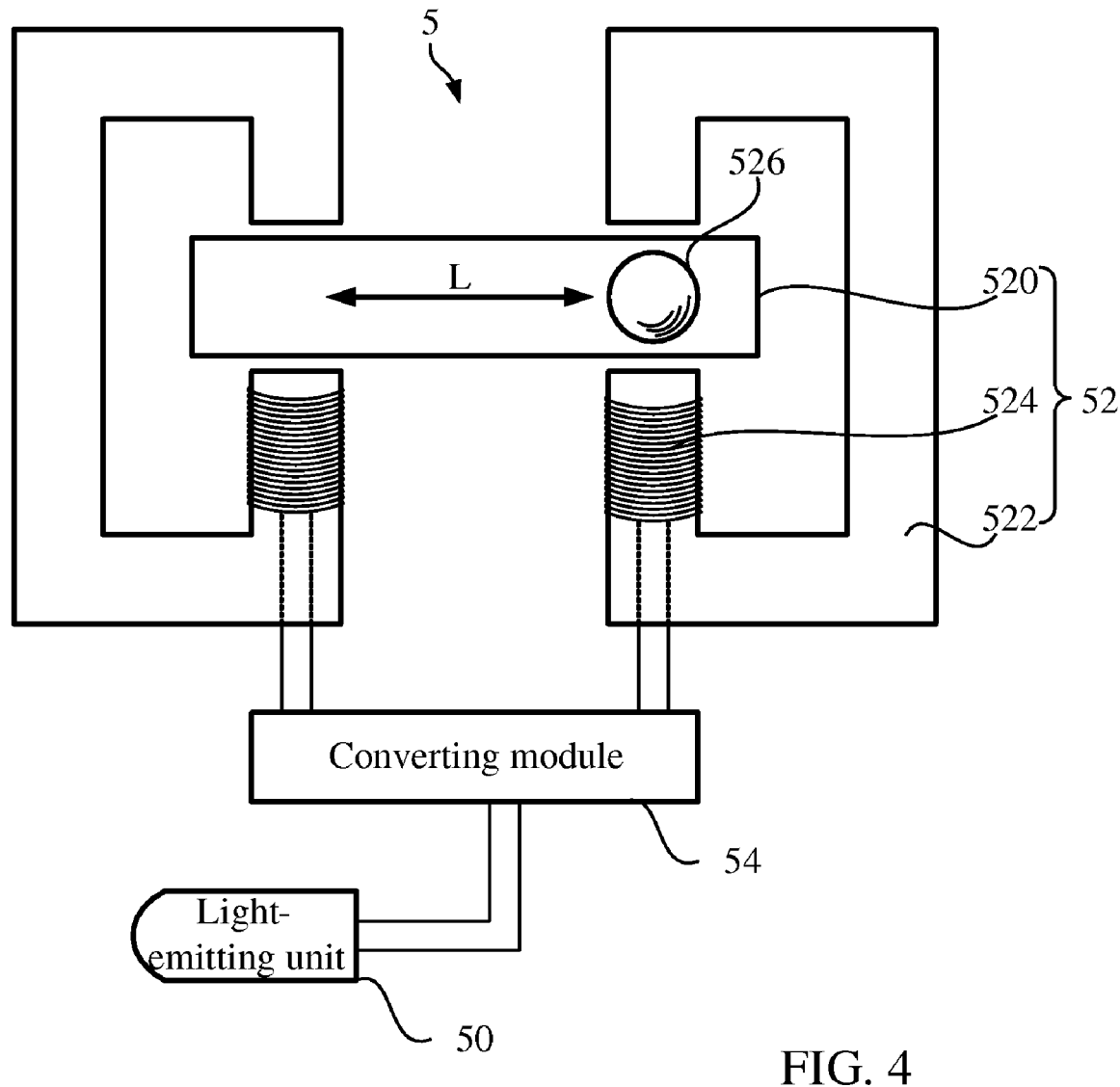
FIG. 4 illustrates the automated light-emitting apparatus of an embodiment of the invention.

Please refer to FIG. 4, which shows an automated light-emitting apparatus of an embodiment of the invention. As shown in FIG. 4, the automated light-emitting apparatus 5 of the invention can comprise a light-emitting unit 50, a power-generating module 52, and a converting module 54. Moreover, the power-generating module 52 further includes a tubular structure 520, a magnetic member 522, and a coil 524.

The tubular structure 520 can contain a magnetic conductor 526; the magnetic member 522 is disposed around the tubular structure 520; and the coil 524 is coupled to the magnetic member 522. When the object receives an external force, the tubular structure 520 slants, the magnetic conductor 526 moves back and forth in the tubular structure 520 along the direction L, and the distance between the magnetic conductor 526 and the magnetic member 522 is changed. Accordingly, the coil 524 can generate the induced electromotive force. Moreover, the converting module 54 can convert the induced electromotive force to a direct current needed by the light-emitting unit 50.

Figure 5:
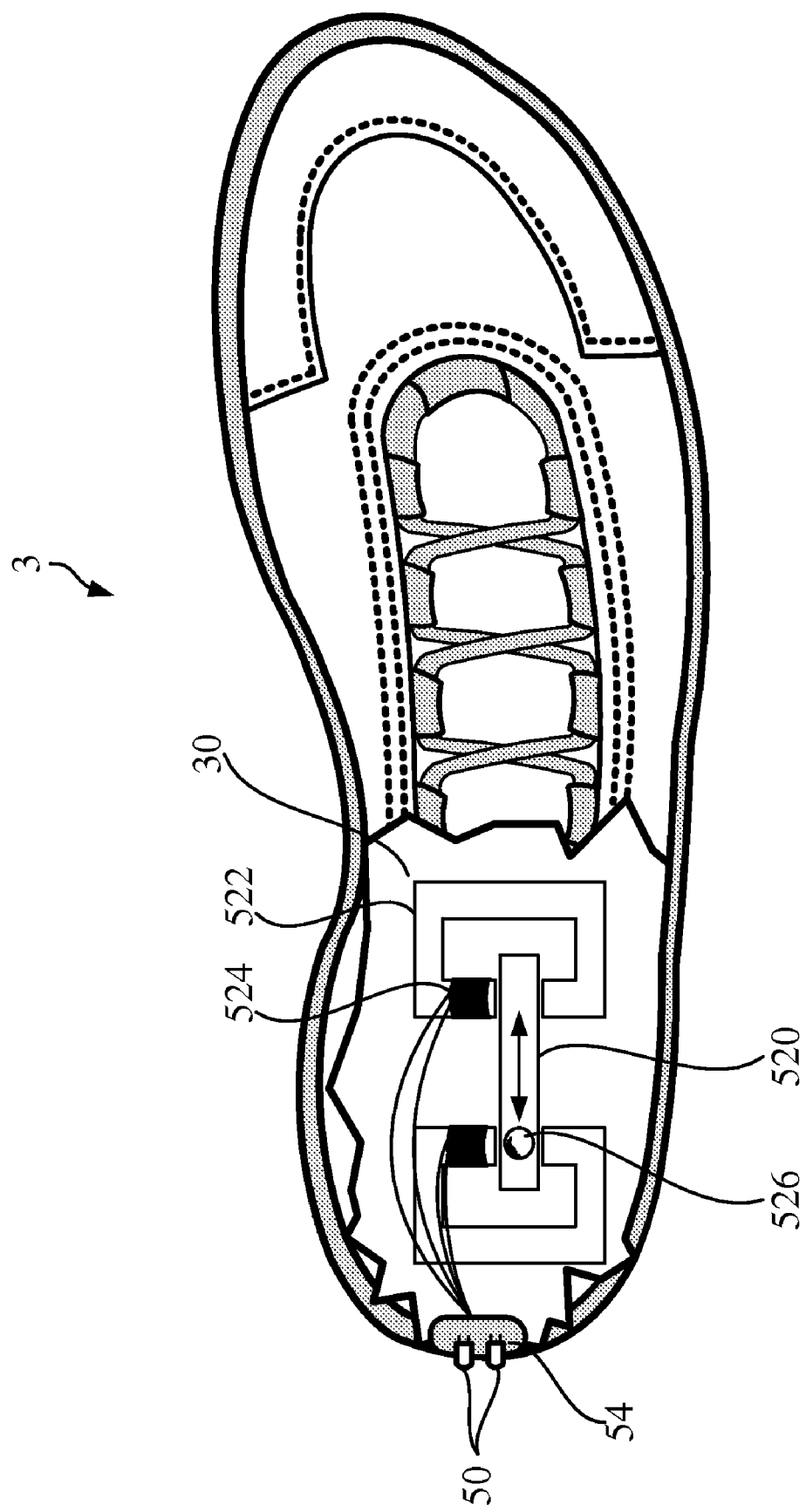
FIG. 5 is a partial sectional view of the wearable object of an embodiment of the invention.
Figure 6A:
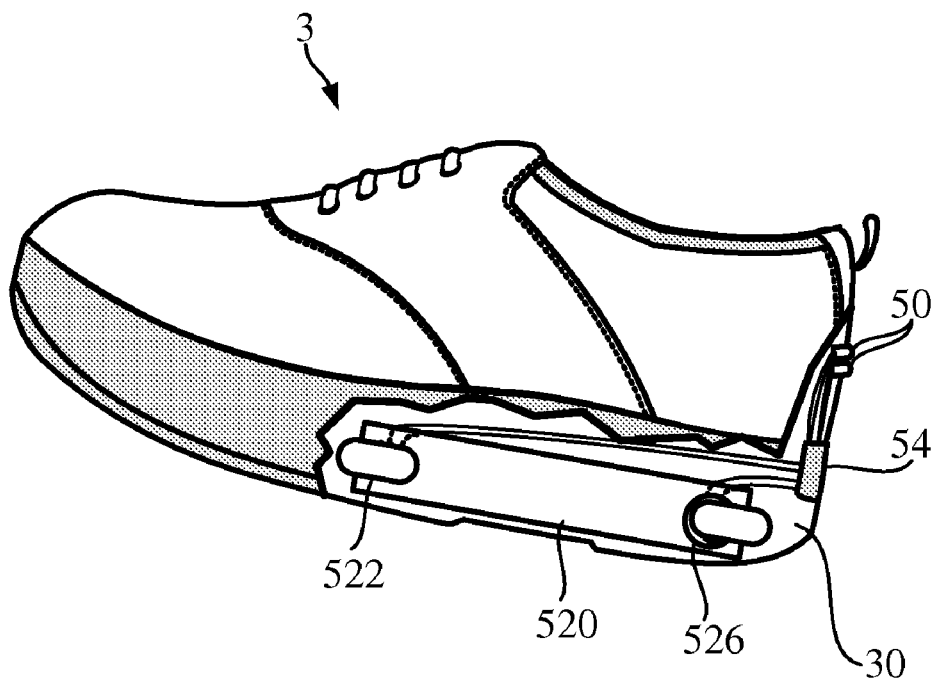
FIG. 6A and FIG. 6B are partial sectional views of the wearable object of an embodiment of the invention.
Figure 6B:
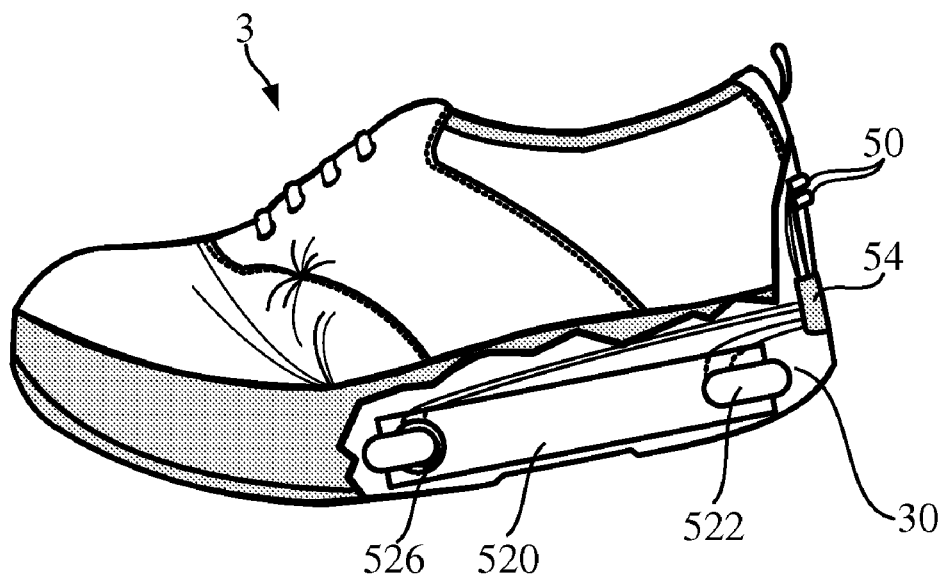

Please refer to FIG. 5, FIG. 6A, FIG. 6B. FIG. 5 is a partial sectional view of the wearable object of an embodiment of the invention; FIG. 6A and FIG. 6B are partial sectional views of the wearable object of an embodiment of the invention. As shown in the figures, the wearable object is a sports shoe 3, and the above-mentioned automated light-emitting apparatus 5 can be disposed in the bottom space 30 of the sports shoe 3.

Particularly, as shown in FIG. 6A, when the user wears the sports shoe 3 and raises his or her tiptoes, the magnetic conductor 526 in the tubular structure 520 will move to the rear side of the tubular structure 520. On the contrary, as shown in FIG. 6B, when the user raises his or her heel, the magnetic conductor 526 in the tubular structure 520 will move to the front side of the tubular structure 520. Obviously, when the user wears the sports shoe 3 to walk or run, the magnetic conductor 526 can repeatedly move back and forth in the tubular structure 520, so that the distance between the magnetic conductor 526 and the magnetic member 522 is continuously changed, and the coil 524 generates an induced electromotive force for supporting the light-emitting unit 50 with needed power.

Figure 7:
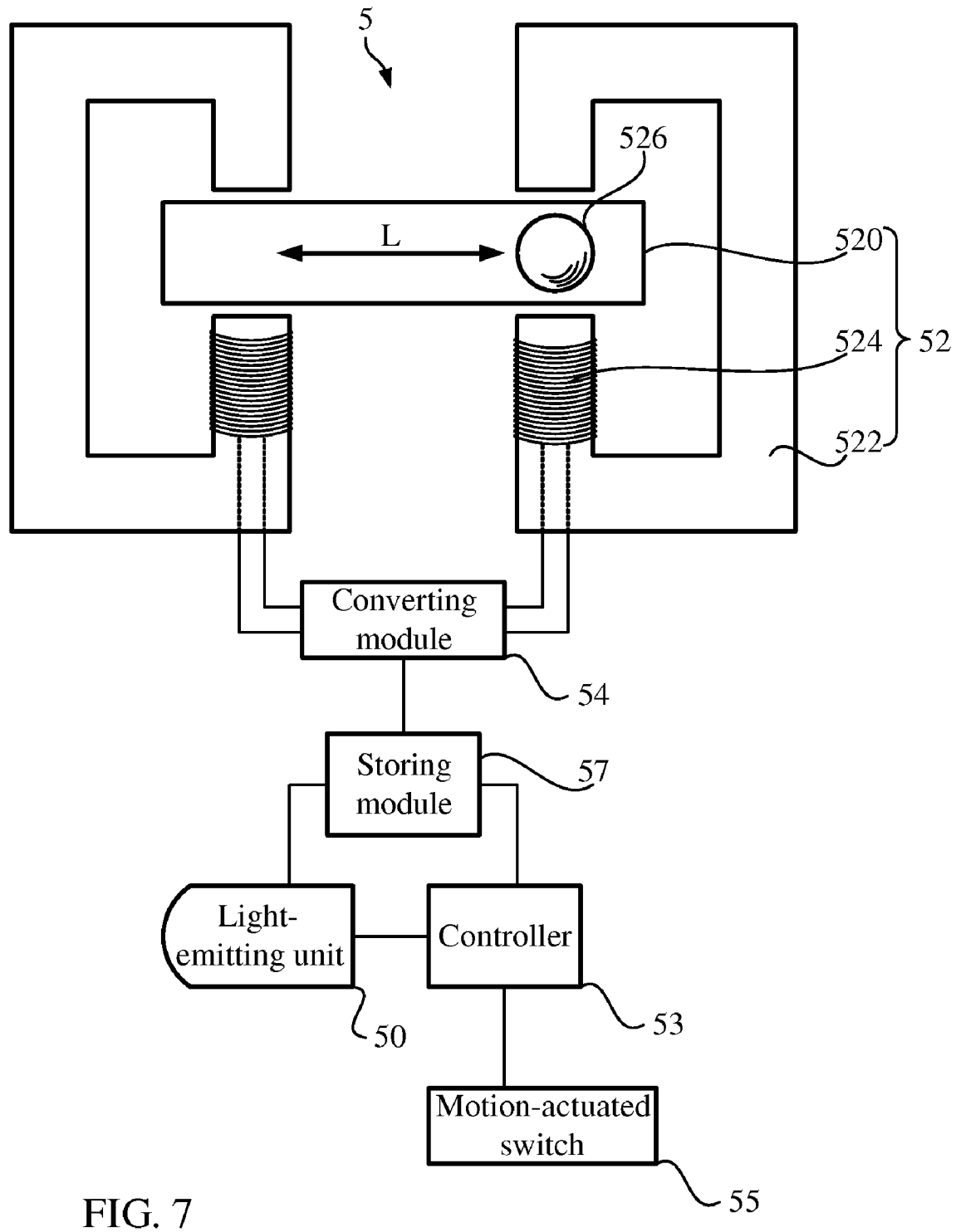
FIG. 7 illustrates the automated light-emitting apparatus of an embodiment of the invention.

Please refer to FIG. 7, which shows an automated light-emitting apparatus of an embodiment of the invention. As shown in FIG. 7, except for the above-mentioned light-emitting unit 50, power-generating module 52, and converting module 54, the automated light-emitting apparatus 5 of the invention can further include a controller 53, a motion-actuated switch, and a storing module 57.

The storing module 57 can be electrically connected to the converting module 56 for storing the power of the direct current. The controller can be connected to the light-emitting unit 50 and the storing module 57 respectively, for receiving the power and driving the light-emitting unit 50 to light. The motion-actuated switch 55 can be connected to the controller 53, for generating an activating signal according to a movement of the object (e.g. the above-mentioned sports shoes). Moreover, the controller 53 can drive the light-emitting unit 50 to light in accordance with the activating signal.

In practice, the movement of the object can be caused by the movement of a user. For example, when the user wears sports shoes and runs, the sports shoes can therefore be shacked, vibrated, and rocked. For another example, when the user wears gloves and acts, the gloves can therefore be rocked. Please note that, the automated light-emitting apparatus of the invention can optionally be disposed in/on any other suitable object, but not limited to the above-mentioned objects. Accordingly, the movement can be different in accordance with the different objects but not limited to the above-mentioned movement.

Figure 8A:
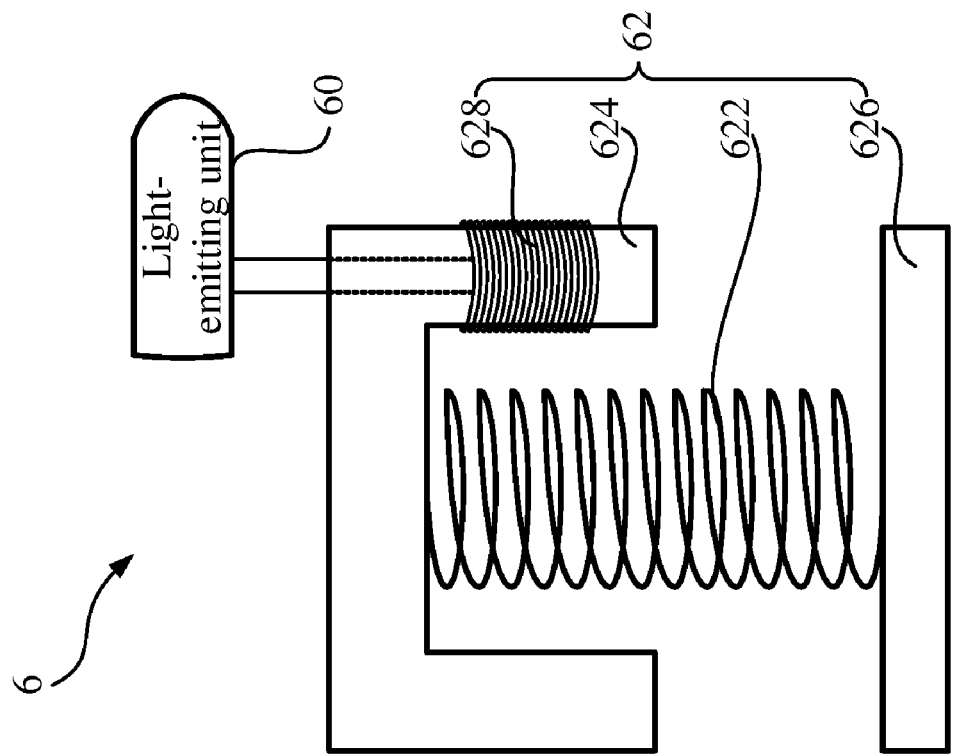
FIG. 8A illustrates the automated light-emitting apparatus of an embodiment of the invention.
Figure 8B:
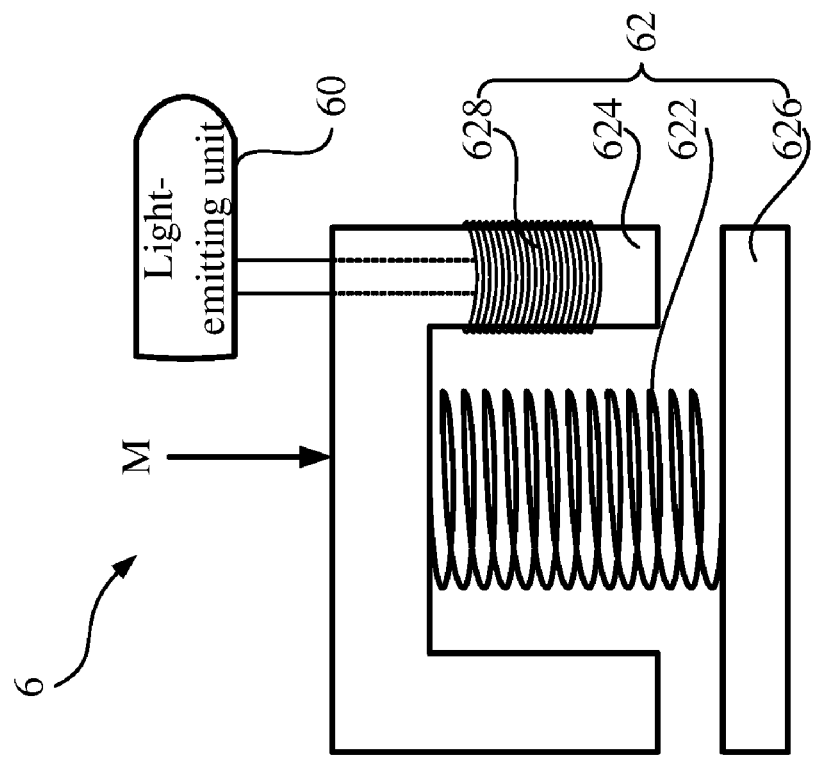
FIG. 8B shows the automated light-emitting apparatus in FIG. 8A receives an external force along the direction M.
Figure 8C:
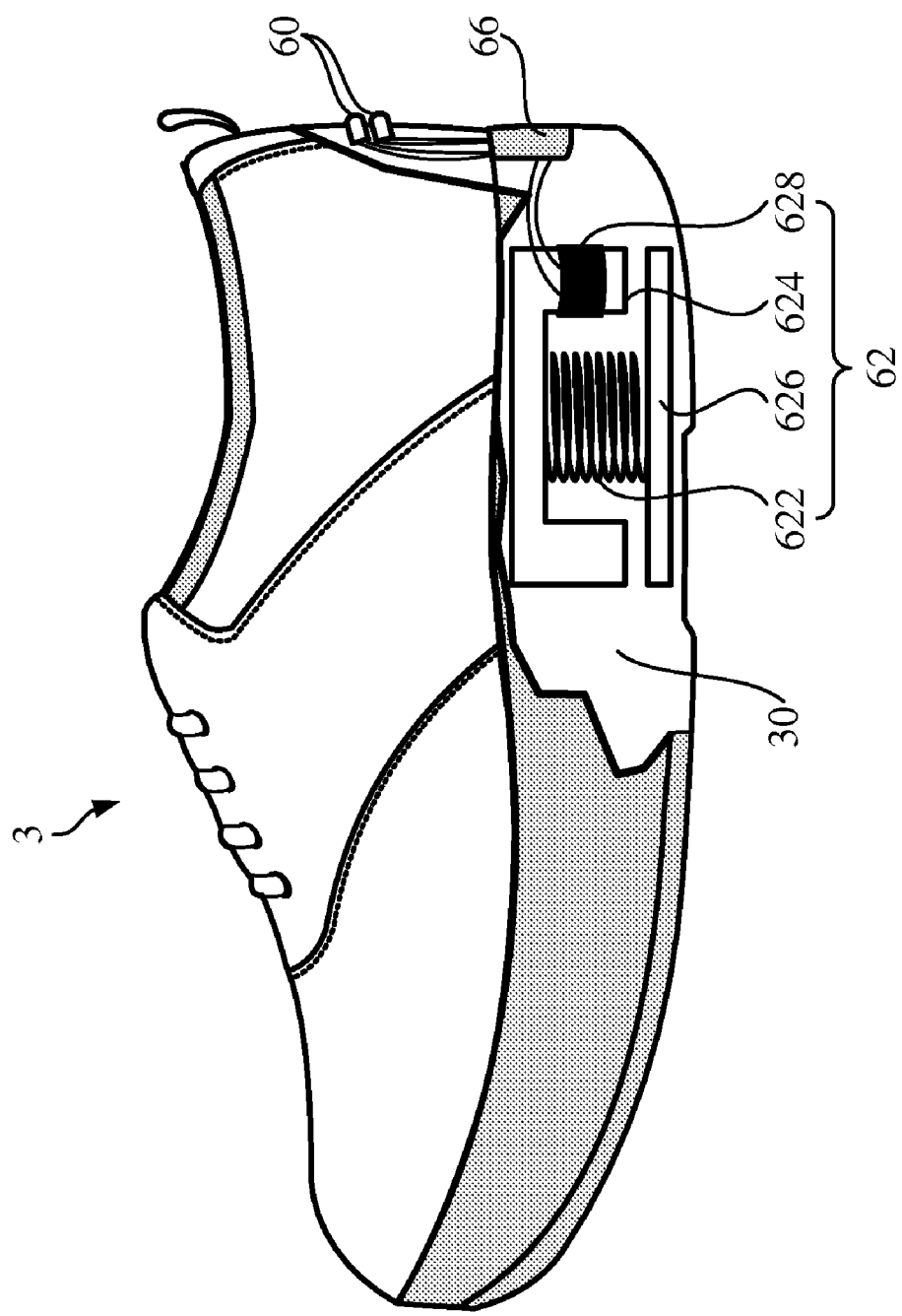
FIG. 8C illustrates the automated light-emitting apparatus in FIG. 8A and FIG. 8B disposed in a sports shoe.

Please refer to FIG. 8A to 8C. FIG. 8A illustrates the automated light-emitting apparatus of an embodiment of the invention; FIG. 8B shows the automated light-emitting apparatus in FIG. 8A receives an external force along the direction M; and FIG. 8C illustrates the automated light-emitting apparatus in FIG. 8A and FIG. 8B disposed in a sports shoe.

In the embodiment, the automated light-emitting apparatus 6 of the invention comprises a light-emitting unit 60 and a power-generating module 62. The power-generating module 62 further comprises an elastic component 622, a first magnetic conductor 624, a second magnetic conductor 626 and a coil 628. Particularly, the second magnetic conductor 626 itself is magnetic; and the coil 628 is coupled to the first magnetic conductor 624. As shown in FIGS. 8A and 8B, when an external force acts on the first magnetic conductor 624 along the direction M, the first magnetic conductor 624 moves close to the second magnetic conductor 626. On the contrary, when the external force disappears, the elastic force provided by the elastic component 622 can force the first magnetic conductor 624 to move apart from the second magnetic conductor 626. Therefore, when the external force is repeatedly added, the distance between the first magnetic conductor 624 and the second magnetic conductor 626 is continuously changed, so that the coil generates the induced electromotive force for supporting the light-emitting unit 60 with needed power.

Furthermore, as shown in FIG. 8C, the power-generating module 62 is disposed in bottom space 30 of the sports shoe 3. When a user wears the sports shoe 3 in FIG. 8C and moves, the stamping action of the user can generate the external force to the first magnetic conductor 624, so as to shorten the distance between the first magnetic conductor 624 and the second magnetic conductor 626. On the contrary, when the user raises his or her foot from the ground, the distance between the first magnetic conductor 624 and the second magnetic conductor 626 can be lengthened. Accordingly, the coil can generate the induced electromotive force.

The automated light-emitting apparatus of the invention can further include a converting module 66 electrically connected to the power-generating module and the light-emitting unit 60, for converting the induced electromotive force to a direct current needed by the light-emitting unit 60. The converting module 66 can be disposed in the heel or other suitable positions of the sports shoe 3. Moreover, the light-emitting unit 60 can be disposed in the back of the sports shoe 3. In practice, the light-emitting unit 60 can optionally be disposed in or out of the sports shoe 3.

Please note that, in practice, the automated light-emitting apparatus in FIGS. 8A to 8C can further comprise the above-mentioned converting module, controller, motion-actuated switch, storing module, and other suitable elements. Because of the function and relationships between said elements are well described above, redundant details are omitted here.

Figure 9A:
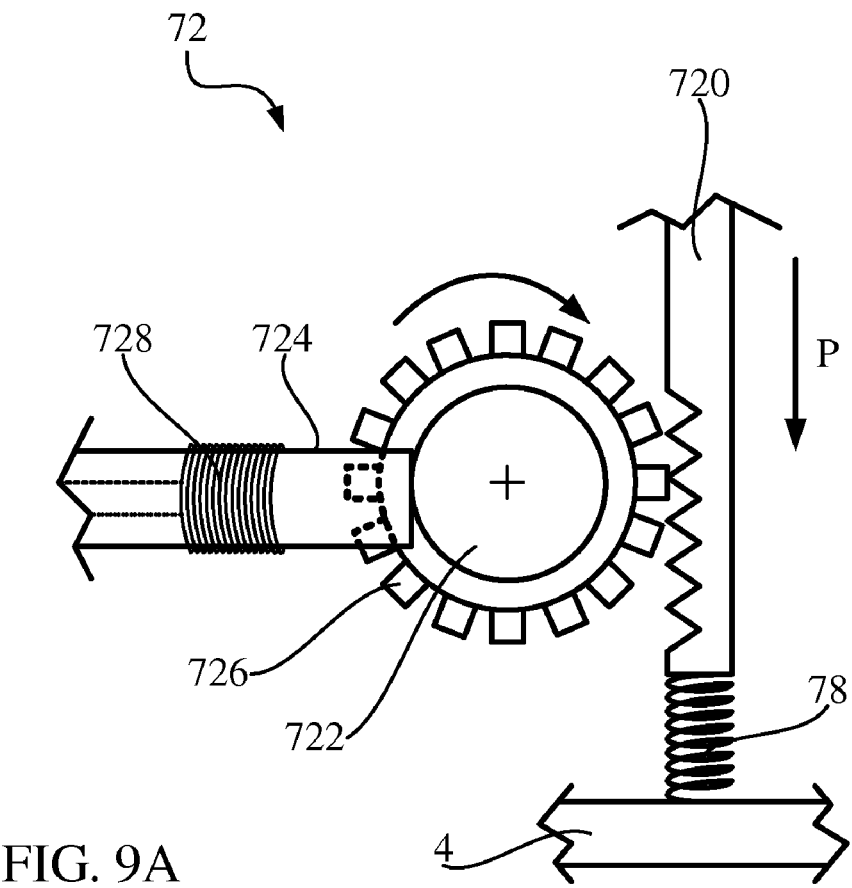
FIG. 9A shows the power-generating module of the automated light-emitting apparatus of an embodiment of the invention.
Figure 9B:
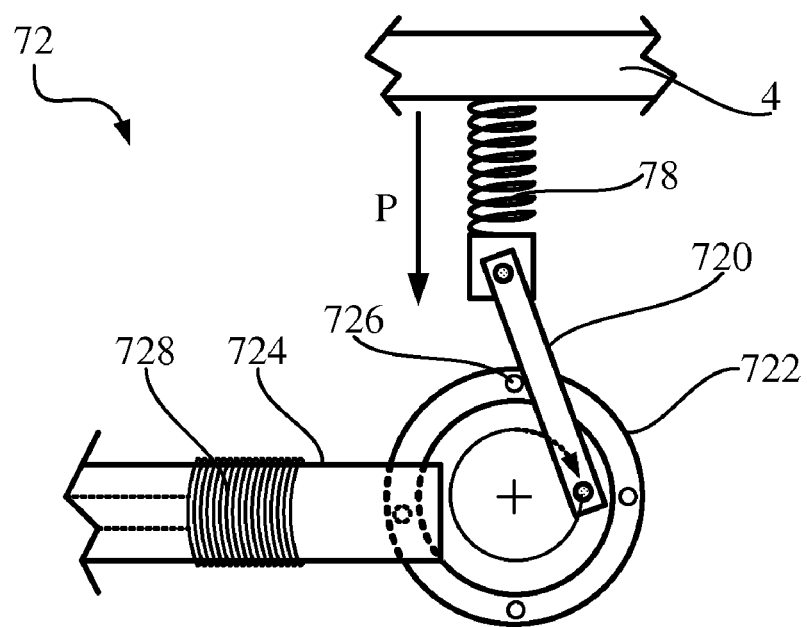
FIG. 9B shows the power-generating module of the automated light-emitting apparatus of an embodiment of the invention.
Figure 9C:
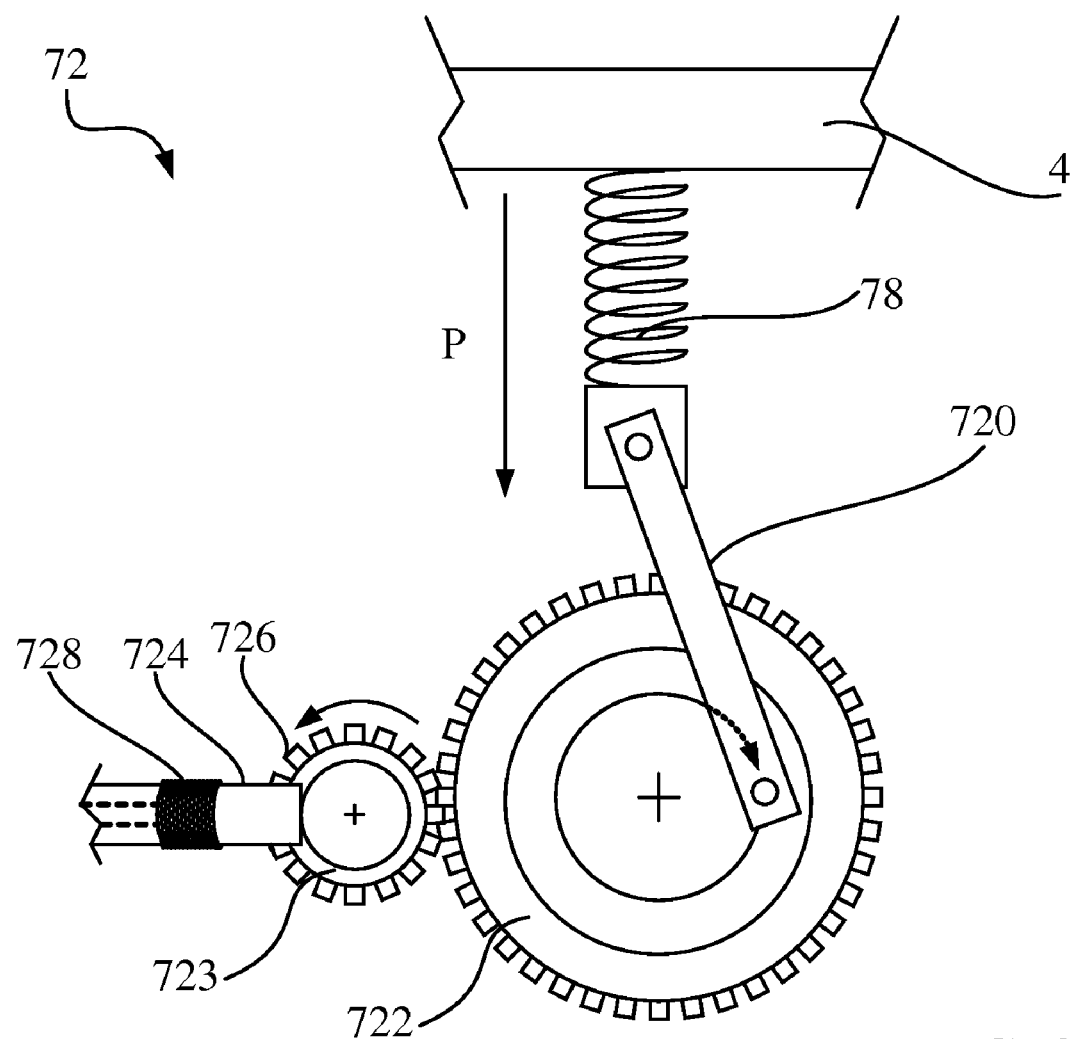
FIG. 9C shows the power-generating module of the automated light-emitting apparatus of an embodiment of the invention.

Please refer to FIGS. 9A to 9C, which show the power-generating module of the automated light-emitting apparatus of an embodiment of the invention.

As shown in FIG. 9A, the power-generating module 72 of the embodiment of the invention comprises a first component 720, a second component 722, a first magnetic conductor 724, a second magnetic conductor 726, and a coil 728. The first component 720 has a tooth structure, and the second component 722 has a gear wheel structure engaged with the tooth structure of the first component. Therefore, when the first component 720 is forced to move along the direction P, the second component 722 can be driven to rotate along the curve arrow. Furthermore, the first magnetic conductor 724 partially overlaps the second component 722. In the embodiment, the first magnetic conductor 724 itself is a magnetic member, and the coil 728 is coupled to the first magnetic conductor 724. A number of second magnetic conductors 726 are disposed on the second component 722 (In the embodiment, the teeth of the tooth structure of the second component 722 are the second magnetic conductor 726).

Furthermore, one end of the first component 720 is connected to an object 4 through an elastic component 78. When the first component 720 is forced to move along the direction P, the second component 722 can be driven to rotate along the curve arrow. Moreover, when the external force is weaken or disappeared, the restoring force of the elastic component 78 can help the first component 720 to move along the reverse direction of the direction P, so that the second component 722 rotates along the reverse direction of the curve arrow. Accordingly, the distance between the second magnetic conductor 726 and the first magnetic conductor 724 can be repeatedly changed, and the coil 728 generates the induced electromotive force.

As shown in FIG. 9B, the power-generating module 72 also includes a first component 720, a second component 722, a first magnetic conductor 724, a second magnetic conductor 726, and a coil 728. Furthermore, an end of the first component is connected with an object 4 via an elastic component 78. Moreover, the first magnetic conductor 724 partially overlaps with the second component. In the embodiment, the first magnetic conductor 724 is a magnetic member, and the coil 728 is coupled to the first magnetic conductor 724. A certain number of second magnetic conductors 726 are disposed on the second component 722. When the user forces the object 4 and lets the first component 720 moves along the direction P, the other end of the first component 720 can be moved along the curve arrow, so as to drive the second component 722 to rotate. Accordingly, the distance between the second magnetic conductor 726 and the first magnetic conductor 724 can repeatedly be changed, and the coil 728 generates the induced electromotive force.

Furthermore, as shown in FIG. 9C, the power-generating module 72 of another embodiment of the invention can further comprise a third component 723 engaged with the second component 722, and driven by the rotation of the second component 722. Moreover, the third component 723 can be a gear wheel, and a certain of second magnetic conductors 726 are disposed on the third component 723 (In the embodiment, the tooth of the third component 723 is the second magnetic conductor 726).

Please note that, in practice, the automated light-emitting apparatus can further include the above-mentioned converting module, controller, motion-actuated switch, storing module, and other suitable elements. Because the elements perform the same function and relationships as described above, redundant descriptions are hereby omitted.

In practice, some or all of the elements of the invention can optionally be sealed within a water-proof enclosure to improve on the resistance of water, dust, and oxidation.

In practice, the light-emitting unit can include a plurality of LEDs. Moreover, the LEDs can comprise, such as red light LEDs, blue light LEDs, green light LEDs, yellow light LEDs, or other suitable LEDs. Furthermore, in practice, the plurality of LEDs can optionally be arranged to cooperate with the pre-determined ways to provide eye-catching illumination. For example, the LEDs can be arranged like a bar, array, or other shapes.

To sum up, the automated light-emitting apparatus of the invention can be driven to generate power through the external force received by the object, and it can further supply the power needed by the light-emitting unit. Accordingly, the automated light-emitting apparatus of the invention can provide illumination in a power-saving way without a battery, so as to fit the requirement of environmental protection.

Although the present invention has been illustrated and described with reference to the preferred embodiment thereof, it should be understood that it is in no way limited to the details of such embodiment but is capable of numerous modifications within the scope of the appended claims.

What is claimed is:

1. An automated light-emitting apparatus, disposed in an object, the automated light-emitting apparatus comprising:
    a light-emitting unit;
    a force-sensing module comprising a first component and a second component engaged with the first component, wherein when the object receives an external force, the force-sensing module changing a distance between a first portion of the first component and a second portion of the second component; and
    a power-generating module comprising:
        a first magnetic conductor engaged to the first portion of the first component; and
        a second magnetic conductor engaged to the second portion of the second component;
    wherein a coil coupled to the first magnetic conductor or the second magnetic conductor, and the first magnetic conductor or the second magnetic conductor comprising a magnetic member, and when the distance between the first portion of the first component and the second portion of the second component is changed, the coil generating an induced electromotive force for supporting the light-emitting unit with needed power.

2. The automated light-emitting apparatus of claim 1, further comprising:
    a converting module, electrically connected to the power-generating module, for converting the induced electromotive force to a direct current needed by the light-emitting unit.

3. The automated light-emitting apparatus of claim 2, further comprising:
    a controller connected to the light-emitting unit and the converting module respectively, for driving the light-emitting unit to light.

4. The automated light-emitting apparatus of claim 3, further comprising:
    a motion-actuated switch connected to the controller, for generating an activating signal according to a movement of the object, and the controller driving the light-emitting unit to light in accordance with the activating signal.

5. The automated light-emitting apparatus of claim 2, further comprising:
    a storing module electrically connected to the converting module, for storing the power of the direct current.

6. The automated light-emitting apparatus of claim 1, further comprising:
    an elastic component, disposed between the first component and the second component, for supplying an elastic power to the first component and the second component.

* * * * *